(12) United States Patent
Jun et al.

(10) Patent No.: US 8,891,806 B2
(45) Date of Patent: Nov. 18, 2014

(54) MOBILE TERMINAL

(71) Applicant: LG Electronics Inc., Seoul (KR)

(72) Inventors: Minsu Jun, Seoul (KR); Leehyun You, Seoul (KR); Hongki Kim, Seoul (KR); Yongsu Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/958,329

(22) Filed: Aug. 2, 2013

(65) Prior Publication Data

US 2014/0146992 A1 May 29, 2014

Related U.S. Application Data

(60) Provisional application No. 61/806,715, filed on Mar. 29, 2013.

(30) Foreign Application Priority Data

Nov. 27, 2012 (KR) ........................ 10-2012-0135537

(51) Int. Cl.
| | | |
|---|---|---|
| *H04R 1/02* | (2006.01) | |
| *H04M 1/00* | (2006.01) | |
| *H01R 12/72* | (2011.01) | |
| *H04M 1/03* | (2006.01) | |
| *H01R 12/71* | (2011.01) | |
| *H04M 1/02* | (2006.01) | |
| *H01R 13/24* | (2006.01) | |

(52) U.S. Cl.
CPC ................ *H04R 1/02* (2013.01); *H01R 12/721* (2013.01); *H01R 12/714* (2013.01); *H04M 1/0277* (2013.01); *H01R 13/24* (2013.01); *H04M 1/03* (2013.01)

USPC ...... 381/394; 381/365; 381/388; 379/433.02; 379/433.05

(58) Field of Classification Search
USPC ................. 381/332–334, 386–388, 365, 394; 379/428.01, 429, 433.02, 433.05; 455/575.1; 439/630, 862
See application file for complete search history.

(56) References Cited

U.S. PATENT DOCUMENTS

| | | | |
|---|---|---|---|
| 2005/0014537 A1* | 1/2005 | Gammon et al. | .......... 455/575.1 |
| 2006/0251281 A1 | 11/2006 | Hyun et al. | |
| 2009/0169046 A1 | 7/2009 | Wu | |
| 2009/0245565 A1* | 10/2009 | Mittleman et al. | ............ 381/365 |
| 2010/0061055 A1* | 3/2010 | Dabov et al. | ............ 361/679.56 |
| 2011/0311086 A1* | 12/2011 | Nakamura et al. | ............ 381/333 |
| 2012/0045081 A1* | 2/2012 | Mittleman et al. | ............ 381/334 |

FOREIGN PATENT DOCUMENTS

| | | | |
|---|---|---|---|
| EP | 1 742 503 A1 | 1/2007 | |
| EP | 2 453 636 A1 | 5/2012 | |
| WO | WO 2009/022202 A1 | 2/2009 | |

* cited by examiner

*Primary Examiner* — Tuan D Nguyen
(74) *Attorney, Agent, or Firm* — Birch, Stewart, Kolasch & Birch, LLP

(57) ABSTRACT

A mobile terminal including a case forming an external appearance, a circuit board positioned in the case, an acoustic output unit, and a connector joined to the acoustic output unit and electrically connected to the circuit board is provided. The connector contacts one lateral surface of the circuit board and is elastically deformed through the contact. The connector may include a fixed end portion inserted into the acoustic output unit and a free end portion connected to the fixed end portion to be elastically displaced.

20 Claims, 8 Drawing Sheets

MOBILE TERMINAL

CROSS-REFERENCE TO RELATED APPLICATIONS

This application claims the priority benefit of Korean Patent Application No. 10-2012-0135537, filed on Nov. 27, 2012 in the Korean Intellectual Property Office and U.S. Patent Application No. 61/806,715, filed on Mar. 29, 2013, the disclosures of which are incorporated herein by reference in their entireties.

BACKGROUND OF THE INVENTION

1. Field of the Invention

The present invention relates to a mobile terminal, and more particularly to a mobile terminal which provided enhanced convenience in assembly thereof.

2. Description of the Related Art

A mobile terminal is a portable device having such functions as voice and video communication, input/output of information, and storage of data. As the functions of such mobile terminals have diversified, mobile terminal are provided with complex functions such as capture of an image or video, reproduction of a music file or a video file, games, reception of broadcasts and wireless Internet, thus realizing a multimedia player.

As mobile terminals have become a personal belonging expressing individuality, the demand for design variety has increased. Examples of such designs for mobile terminals include bar-type, slide-type, folder-type and swivel-type structures.

To support and promote mobile terminal functions, a structure of a mobile terminal may be improved or a novel structure may be proposed for mobile terminals.

In conventional cases, to electrically connect a circuit board with various acoustic output units, a spring has been used at an upper or lower end of an acoustic output unit, or a wire connected to the acoustic output unit has been bonded to the circuit board via solder. Using a spring is disadvantageous in that it increases mobile terminal thickness, while wire bonding is disadvantageous in that soldering is time consuming, thereby lowering work efficiency.

BRIEF SUMMARY OF THE INVENTION

Therefore, the present invention has been made in view of the above problems, and it is an object of the present invention to provide a mobile terminal which is provided with a reduced thickness and improved contact between an acoustic output unit and a circuit board.

In accordance with an aspect of the present invention, the above and other objects can be accomplished by the provision of a mobile terminal including a case forming an external appearance, a circuit board positioned in the case, an acoustic output unit positioned in the case, and a connector joined to the acoustic output unit and electrically connected to the circuit board, wherein the connector is adapted to contact one lateral surface of the circuit board and be elastically deformed through the contact.

In accordance with another aspect of the present invention, there is provided a mobile terminal including a case forming an external appearance, a circuit board positioned in the case, an acoustic output unit positioned in the case, and a connector joined to the acoustic output unit and electrically connected to the circuit board, wherein the connector may be adapted to contact one lateral surface of the circuit board and to be elastically deformed through the contact, wherein the connector may include a fixed end portion, one end thereof being inserted into the acoustic output unit, and a free end portion, one end thereof being connected to the fixed end portion and the other end thereof being elastically displaced by contact with the circuit board.

The mobile terminal may further include a bracket formed to allow the acoustic output unit to be seated therein and to mount the acoustic output unit to the case.

An end of the free end portion may be bent toward the acoustic output unit, wherein a bent part of the free end portion may contact a lower region of the circuit board, wherein an electrode to supply electric power to the free end portion may be formed under the circuit board.

In addition, one lateral surface of the circuit board may be provided with a protruding bumper protruding toward the acoustic output unit.

One lateral surface of the circuit board may be provided with a seating recess allowing the free end portion to be seated therein, wherein the free end portion is seated in the seating recess.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
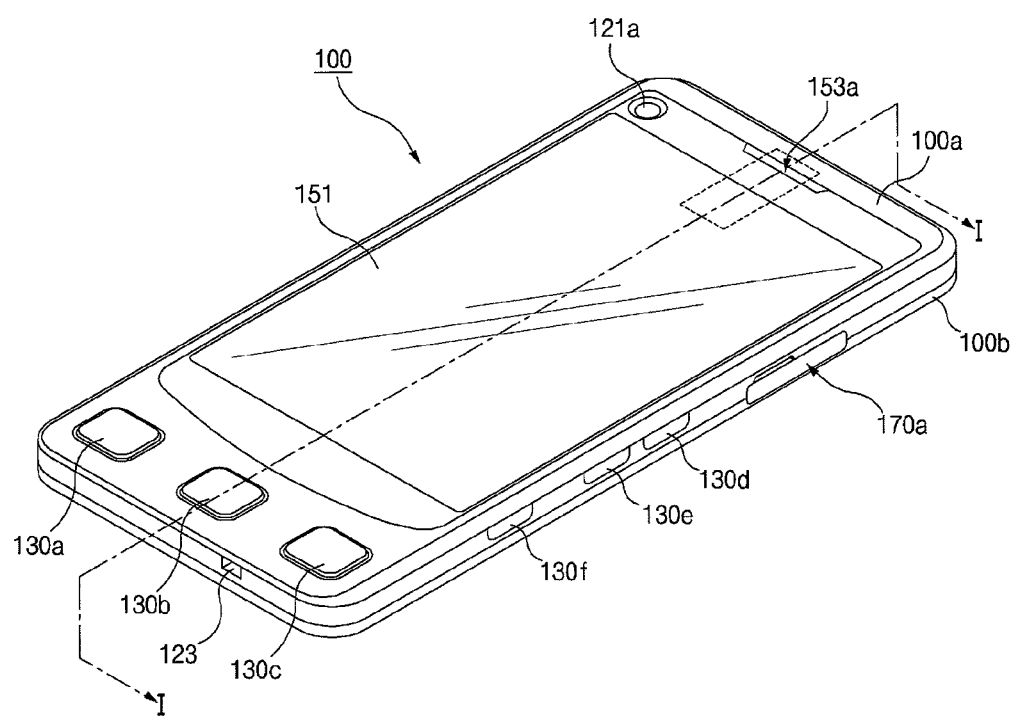
FIG. 1 is a perspective view showing a mobile terminal according to an embodiment of the present invention as seen from the front side thereof.

Reference will now be made in detail to the preferred embodiments of the present invention, examples of which are illustrated in the accompanying drawings. Wherever possible, the same reference numbers will be used throughout the drawings to refer to the same or like parts.

As shown in the drawings, the terms "below," "beneath," "lower," "above," and "upper" indicating relative positions in space may be used for easy description of relations between constituents. When terms indicating relative spatial positions are used or employed for arrangements different from those shown in the drawings, they should be understood as including different orientations of constituents. For example, if a constituent in a drawing is upside down, the constituent described as being placed "below" or "beneath" another constituent may be "above" the other constituent. Accordingly, the term "below" can include both "below" and "above." A constituent can be oriented in a different direction, and thereby the terms representing relative positions in space can be interpreted according to the orientation of the constituent.

The terms in this specification are used simply for description of embodiments and are not intended to limit the present invention. As used herein, the singular forms "a", "an" and "the" are intended to include the plural forms as well, unless context clearly indicates otherwise. The terms "comprise" and/or "comprising" used in this specification do not exclude presence or addition of one or more other constituents, steps and/or operations in addition to the stated constituent, step, and/or operation.

Unless otherwise defined herein, all terms (including scientific and technical terms) used in the present specification may have meanings commonly understood by those skilled in the art. Unless specifically and clearly defined herein, the terms used herein shall not be confined to strict dictionary definitions.

In the drawings, the thickness or size of each constituent is exaggerated, omitted or schematically illustrated for ease description and clarity. In addition, the size or area of each constituent does not completely reflect the real size or area thereof.

In addition, angles and directions referred in description of structures of embodiments are based on the illustrations of the drawings. In the case that a reference point or a reference position for an angle is not clearly stated in description of structures forming the embodiments, refer to the relevant drawings.

Hereinafter, a mobile terminal according to the present invention will be described in more detail with reference to the accompanying drawings. As used herein, the suffixes "module" and "unit" applied to constituents are added or used interchangeably to facilitate description of the present invention, and do not suggest any unique meanings or functions.

The mobile terminals described in this specification includes cell phones, smart phones, notebook computers, terminals for digital broadcasts, personal digital assistants (PDAs), portable multimedia players (PMPs) and navigation devices.

A mobile terminal related to the present invention will be described in detail with respect to constituents forming the external appearance thereof, with reference to FIGS. 1 and 2. Hereinafter, a bar-type mobile terminal provided with a touchscreen on the front thereof will be described as an example among other types of mobile terminals including folder, bar, swing and slider types, for convenience of description. However, the present invention is applicable to any type of mobile terminals including the types described above including the bar-type mobile terminal.

Figure 2:
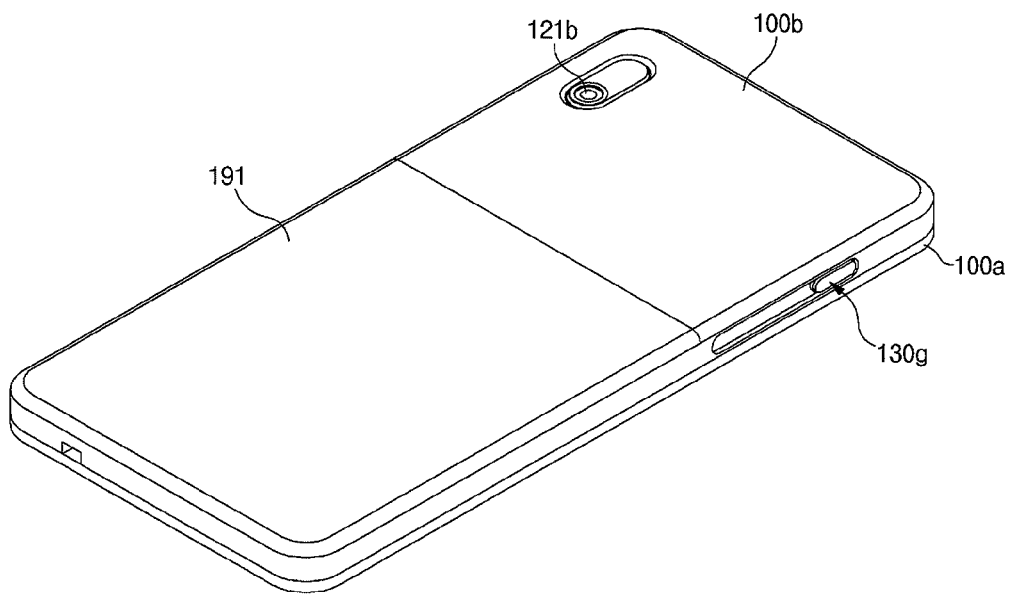
FIG. 2 is a perspective view showing the mobile terminal according to the embodiment as seen from the back side thereof.

FIG. 1 is a perspective view showing a mobile terminal according to an embodiment of the present invention seen from the front side thereof, and FIG. 2 is a perspective view showing the mobile terminal according to the embodiment seen from the back side thereof. A case forming an external appearance of a mobile terminal 100 is formed by a front case 100a and a rear case 100b. Various electronic components are installed in the space formed by the front case 100a and the rear case 100b. At least one intermediate case may be additionally disposed between the front case 100a and the rear case 100b. Such cases may be formed via injection molding of synthetic resin, or formed of a metallic material such as, for example, stainless steel (STS) or titanium (Ti).

Referring to FIG. 1, a display unit 151, a first acoustic output module 153a, a first camera 121a and first to third user input units 130a to 130c may be disposed at the front case 100a. In addition, a first interface unit 170a, fourth to sixth user input units 130d to 130f and a microphone 123 may be disposed on the lateral surface of the rear case 100b.

The display unit 151 may be a liquid crystal display (LCD) or organic light emitting diodes (OLED) for display of information. A touch pad may overlap with the display unit 151 as a layer structure, and thereby the display unit 151 may operate as a touchscreen, allowing information to be input therethrough when a user touches the screen.

The display unit 151 outputs and displays information processed by the mobile terminal 100. For example, when the mobile terminal 100 is in call mode, the display unit 151 displays a user interface (UI) or a graphical user interface (GUI) related to call. When the mobile terminal 100 is in video communication mode or image capture mode, images received or captured may be separately or simultaneously displayed along with the UI and GUI.

As described above, when a touchscreen is configured with the display unit 151 and the touch pad arranged in a layer structure, the display unit 151 may be used as an output unit as well as an input unit. In the case that the display unit 151 is configured as a touchscreen, the display unit 151 may include a touchscreen panel and a touchscreen panel controller. In this case, the touchscreen panel, which is a transparent panel attached to the outside of the display unit 151, may be connected to an internal bus of the mobile terminal 100.

The touchscreen panel may be configured to convert change in pressure applied to a certain part of the display unit 151 or capacitance produced at a part of the display unit 151 into an electrical input signal. The touchscreen panel may be configured to detect pressure of touch as well as the position and area of the part that is touched.

When touch inputs are produced, the touchscreen panel, which monitors contact, sends corresponding signals to the touchscreen panel controller. The touchscreen panel controller processes the signals and then transmits corresponding data to a control unit 180 to allow the control unit 180 to recognize the touch inputs and the touched regions of the touchscreen.

In addition, the display unit 151 may include at least one of a liquid crystal display, a thin film transistor-liquid crystal display, an organic light-emitting diode, a flexible display and a 3D display.

Some of these displays may be configured to be transparent or light-transmittable such that the outside is visible therethrough. Thereby, they may be referred to as transparent displays. A representative example of the transparent displays is a transparent OLED (TOLED). The rear structure of the display unit 151 may also be configured to be light-transmittable. Due to this structure, a user is allowed to see objects located at the rear side of the terminal body through the region of the terminal body occupied by the display unit 151.

Depending on embodiments of the mobile terminal 100, two or more display units 151 may be provided. For example, an external display unit (not shown) and an internal display unit (not shown) may be provided to the mobile terminal 100.

The first acoustic output module 153a outputs audio data received from a wireless communication unit (not shown) or stored in a memory (not shown) in a call signal reception mode, call mode, record mode, voice recognition mode, broadcast reception mode. In addition, the first acoustic output module 153a outputs an acoustic signal related to functions performed by the mobile terminal 100, for example, sounds of call signal reception and message reception. The first acoustic output module 153a may include a receiver, a speaker and a buzzer.

The first camera 121a may be realized in a form appropriate to capture an image or video of the user.

In addition, the microphone 123 receives an external acoustic signal via a microphone and electrically processes the audio data in the call mode, record mode, or voice recognition mode. In the call mode, the processed audio data may be converted, by a mobile telecommunication module (not shown), into a form transmittable to a mobile telecommunication base station and output. The microphone 123 may use various noise elimination algorithms to eliminate noise generated during reception of external acoustic signals.

The first to sixth user input units 130a to 130f, which may be commonly referred to as the user input unit 130, can employ any method that allows the user to manipulate the user input unit 130 in a tactile manner.

For example, the user input unit 130 may be implemented as a dome switch or touch pad, which can receive a command or information through press or touch by the user, a wheel or jog dial having a key manipulated via rotation, a joystick, or a slide switch having a key manipulated via sliding. Regarding functions of the user input units, the first to third user input units 130a to 130c are used for input of a command such as start, end and call, while the third to sixth user input units 130d to 130f may operate as hot-keys used for input of selection of an operation mode or activation of special functions.

The first interface unit 170a serves as a passage allowing the mobile terminal 100 to exchange data with external devices therethrough. For example, the first interface unit 170a may be at least one of a connection terminal to be connected to an earphone in a wired or wireless manner, a port for short-range communication, and a power supply terminal for supply of power to the mobile terminal 100. The first interface unit 170a may be a card socket to accommodate a subscriber identification module (SIM) or a user identity module (UIM) and an external card such as a memory card for storage of information.

Referring to FIG. 2, a composite key module 130g may be disposed at a lateral surface of the rear case 100b, and a second camera 121b and a power supply cover 191 may be mounted to the rear surface of the rear case 100b.

The second camera 121b may be oriented so as to capture images in a direction substantially opposite to that of the first camera 121a, and may have a different pixel resolution than the first camera 121a. For example, the first camera 121a may have a lower resolution sufficient to capture and transmit an image of the user's face for video communication. On the other hand, the second camera 121b preferably has a large number of pixels since an image of a general subject for photography is not often transmitted immediately after being captured by the second camera 121b.

The power supply cover 191 is detachably connected to the rear case 100b. The power supply 190, for example, a rechargeable battery, is provided inside the power supply cover 191.

A second acoustic module (not shown) may be additionally disposed at the rear case 100b. The second acoustic module may perform a stereo function in conjunction with the first acoustic output module 153a, and may be used for communication in a speakerphone mode.

In addition, an antenna for reception of broadcast signals (not shown) as well as an antenna for a call may be disposed at one side of the rear case 100b. The antenna may be installed to be withdrawable from the rear case 100b.

Figure 3:
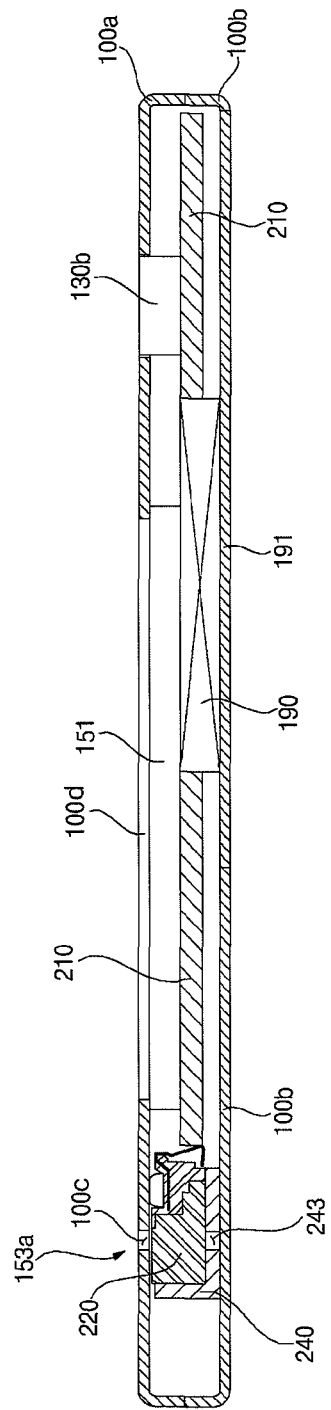
FIG. 3 is a cross-sectional view taken along line I-I of FIG. 1.
Figure 4:
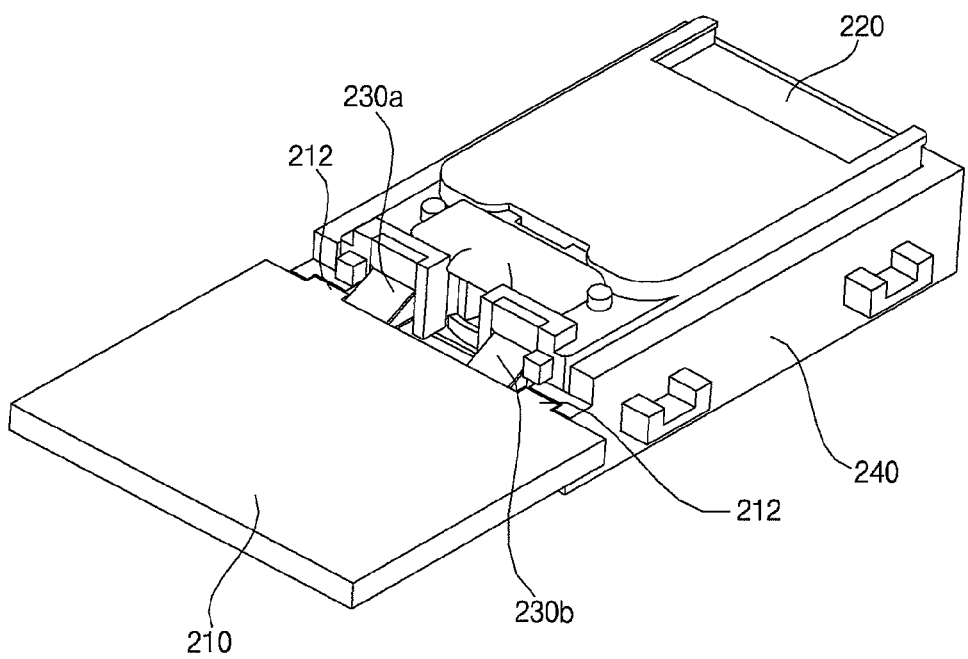
FIG. 4 is an enlarged partial perspective view showing the inside of a portion indicated by a dotted line in FIG. 1.
Figure 5:
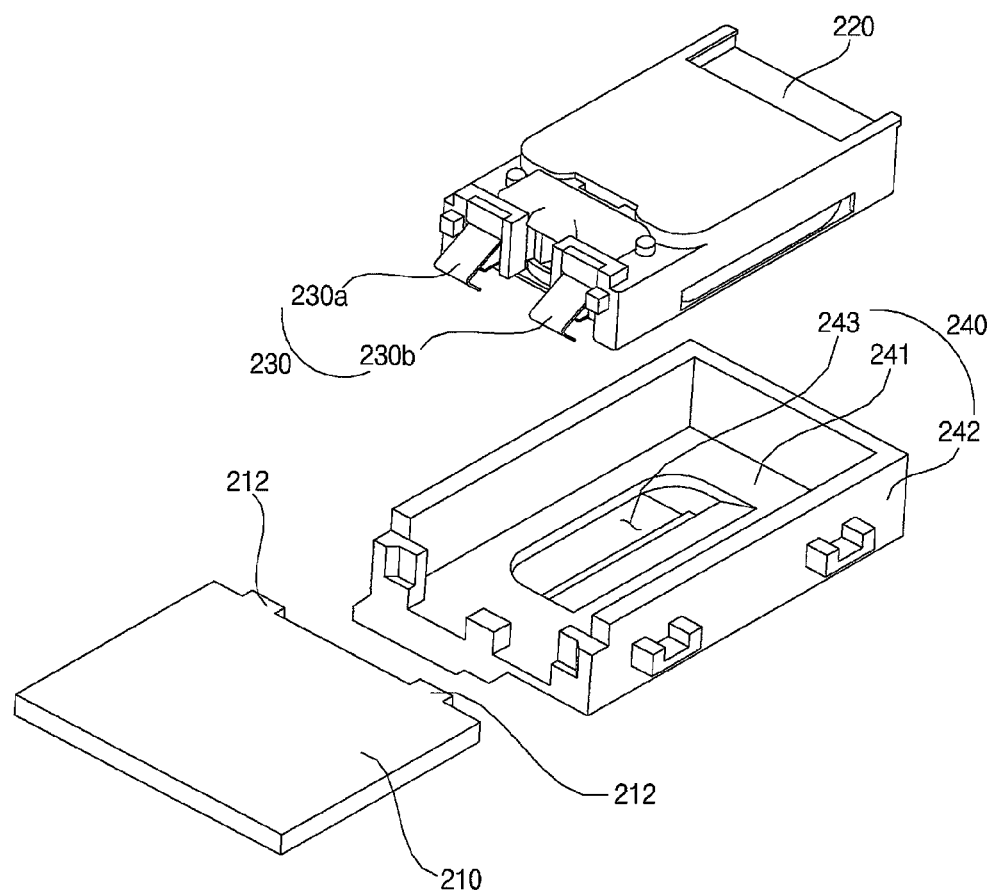
FIG. 5 is an exploded perspective view illustrating an embodiment according to FIG. 4.
Figure 6:
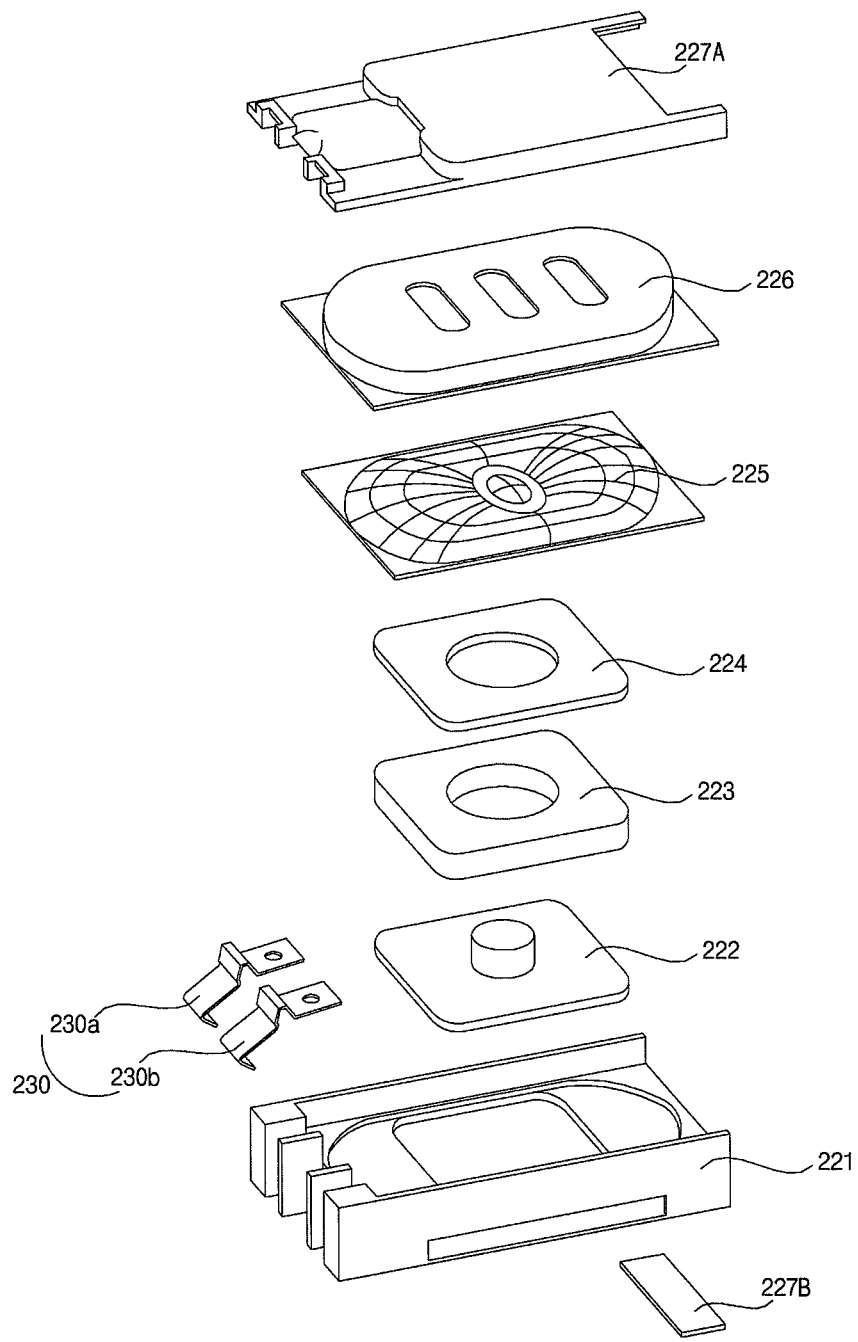
FIG. 6 is an exploded perspective view showing an acoustic output unit according to the illustrated embodiment.
Figure 7:
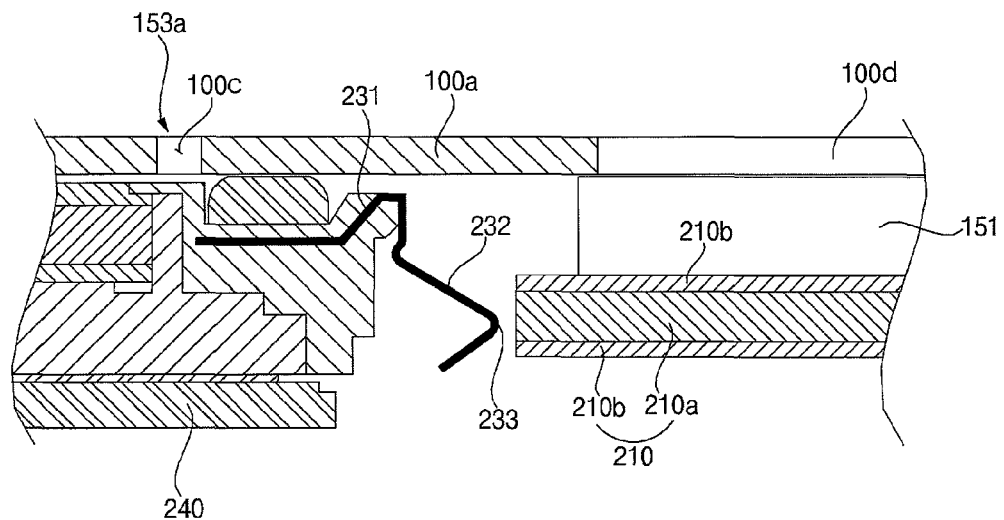
FIG. 7 is a partial cross-sectional view of FIG. 3, in which parts are not yet connected to each other.
Figure 8:
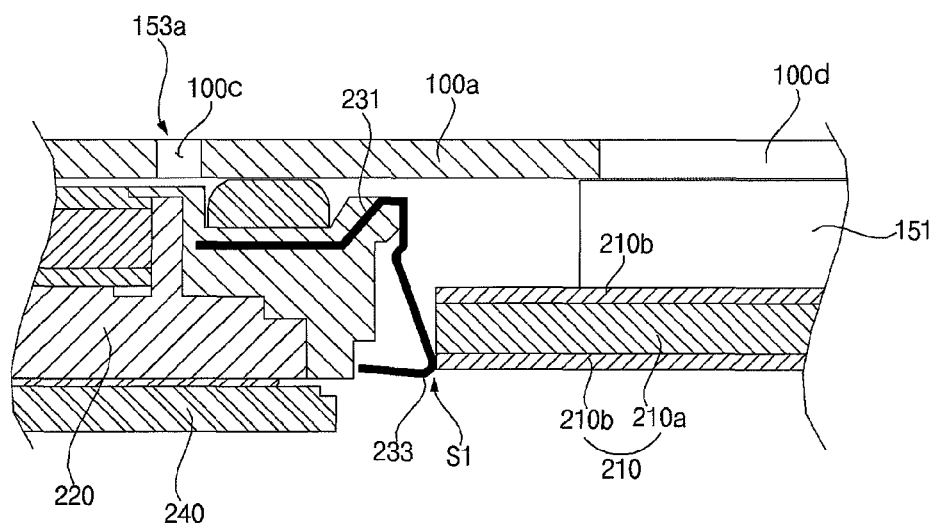
FIG. 8 is a partial cross-sectional view of FIG. 3, in which parts are connected.

FIG. 3 is a cross-sectional view taken along line I-I of FIG. 1, FIG. 4 is an enlarged partial perspective view showing the inside of a portion indicated by a dotted line in FIG. 1, FIG. 5 is an exploded perspective view illustrating an embodiment according to FIG. 4, FIG. 6 is an exploded perspective view showing an acoustic output unit according to the illustrated embodiment, FIG. 7 is a partial cross-sectional view of FIG. 3, in which parts are not yet connected, and FIG. 8 is a partial cross-sectional view of FIG. 3, in which parts are connected.

Referring to FIGS. 3 to 5, the mobile terminal 100 according to the illustrated embodiment includes a case forming an external appearance, a circuit board 210 positioned in the case, an acoustic output unit 220 positioned in the case, and a connector 230 joined to the acoustic output unit 220 and electrically connected to the circuit board 210. The connector 230 is adapted to contact one lateral surface of the circuit board 210 and to be elastically deformable by contact.

The circuit board 210 is installed in the case of the mobile terminal 100.

The circuit board 210 may be mounted to, for example, the front case 100a or the rear case 100b, mounted to a separate internal structure, or mounted to an intermediate case.

The circuit board 210 is configured as an example of a control unit (not shown) to activate various functions of the mobile terminal 100.

A plurality of circuit boards 210 may be provided, and the functions of the control unit may be performed by a combination of the circuit boards 210. To perform such functions, various acoustic output units 220 are electrically connected to the circuit board 210. In addition, the circuit board 210 may be formed to have a predetermined inner space as shown in FIG. 3. The power supply 190 or the acoustic output unit 220 may be positioned in the inner space of the circuit board 210.

In addition, the circuit board 210 is electrically connected to an antenna and adapted to process wireless signals corresponding to wireless electromagnetic waves transmitted to or from the antenna. The antenna is disposed between the rear case 100b and the circuit board 210 and transmits/receives wireless signals mainly through the rear case 100b.

The circuit board 210 is realized, for example, as a printed circuit board (PCB). The circuit board 210 may be realized as a flexible printed circuit board (FPCB) to be connected to a main circuit board (not shown).

The case may include the front case 100a provided with a window to allow the front surface of the display unit 151 to be exposed, and the rear case 100b to cover rear surfaces of the display unit 151 and the circuit board 210.

The acoustic output unit 220 to perform various functions is positioned in the case.

The acoustic output unit 220 includes an electronic component to perform a function of the control unit of the mobile terminal 100. For example, the acoustic output unit 220 may include a microphone, a receiver, a vibration motor, or a speaker.

The acoustic output unit 220 may be directly joined to the case. Alternatively, it may be seated on a bracket 240 and joined to the case for protection from external shock and enhanced reliability.

The bracket 240 has a form corresponding to the acoustic output unit 220 to allow the acoustic output unit 220 to be seated thereon and mounts the acoustic output unit 220 to the case. That is, in the case that the acoustic output unit 220 has an approximately hexahedral shape, the bracket 240 may have a shape corresponding to that of the acoustic output unit 220.

The bracket 240 may be formed of the same material as the case and integrated with the case. Preferably, the bracket 240 is formed of a material different from that of the case to damp shock applied thereto. That is, the bracket 240 may be formed of a material more ductile than that of the case, or may be shaped to have only one region joined to the case through contact.

In addition, the bracket 240 may be shaped to surround the acoustic output unit 220. For example, the bracket 240 may include a bottom portion 241 allowing the acoustic output unit 220 to be seated thereon and forming a bottom, and a wall portion 242 protruding from the bottom portion 241 to surround the lateral surface of the acoustic output unit 220.

A part of the wall portion 242 to which the connector 230 is joined may be partially open to provide a space allowing displacement of the connector 230 therein. That is, a part of one surface of the wall portion 242 is open.

The bottom portion 241 may come into surface contact with the case. The bottom portion 241 preferably comes into surface contact with the rear case 100b, and thus the acoustic output unit 220 can be stably fixed to the case and protected from external shock.

In addition, the bracket 240 may include a cover (not shown) to cover the top surface of the acoustic output unit 220. Preferably, the top of the bracket 240 is open and can be protected by the front case 100a which is disposed at the upper portion of the acoustic output unit 220 and, also, is spaced from the acoustic output unit 220.

In another example, the acoustic output unit 220 may be a microphone, a receiver, or a speaker. In this case, a through hole 243 to transfer sound to the outside may be formed in one surface of the bracket 240. The case may also have a through hole at a position corresponding to that of the through hole 243 formed in the bracket 240. While the through hole 243 is illustrated in FIG. 5 as being formed in the bottom portion 241, embodiments of the preset invention are not limited thereto.

Even when the bottom portion 241 comes into surface contact with the rear case 100b for stable attachment, the through hole 243 can provide a space allowing sound generated by the acoustic output unit 220 to reverberate, thus producing a magnificent sound.

The front case 100a may include a hole 100c allowing sound generated by the acoustic output unit 220 to pass therethrough. The position of the hole 100c is not limited. However, the hole 100c is preferably positioned to vertically overlap the acoustic output unit 220.

The acoustic output unit 220 is spaced from the case to form a reverberation space allowing sound to reverberate. For example, the acoustic output unit 220 may be spaced from the lateral surface and/or top surface of the front case 100a to form a reverberation space. However, embodiments of the present invention are not limited thereto. The acoustic output unit 220 may alternatively be spaced from the rear case 100b to form a reverberation space. The connector 230 is joined to the acoustic output unit 220 to electrically connect the acoustic output unit 220 to the circuit board 210.

The connector 230 is joined to the acoustic output unit 220, thereby being electrically connected to the circuit board 210. For example, the connector 230 contacts one lateral surface of the circuit board 210, and can be formed to be elastically deformed through such contact. That is, elastic resilience of the connector 230 causes the connector 230 to contact one lateral surface of the circuit board 210 to supply electricity to the acoustic output unit 220.

The connector 230 may be joined to the acoustic output unit 220 such that the connector 230 makes a smaller displacement than the thickness of the acoustic output unit 220. For example, the connector 230 may be joined to one lateral surface of the acoustic output unit 220. That is, the connector 230 may include a portion protruding from a lateral surface of the acoustic output unit 220 and having elasticity. As an example of such a connector 230, the connector 230 can be a leaf spring or a C-clip.

The connector 230 may be integrated with the acoustic output unit 220. Preferably, the connector 230 and the acoustic output unit 220 are formed through insert molding or double-injection molding. That is, the connector 230 and the acoustic output unit 220 may be formed by inserting the connector 230 into an injection mold for the acoustic output unit 220.

The connector 230 may include a material having conductivity and elasticity. For example, the connector 230 may be formed of a metal or an alloy having predetermined elasticity and rigidity.

The connector 230 functions as an electrode terminal of the acoustic output unit 220. For example, the connector 230 may include a first connector 230a and a second connector 230b. The first connector 230a and the second connector 230b are formed to have opposite polarities.

Referring to FIGS. 7 and 8, the acoustic output unit 220 is seated in the bracket 240, and the circuit board 210 is arranged adjacent to one side of the acoustic output unit 220. In addition, the display unit 151 is positioned at the upper portions of the circuit board 210 and the acoustic output unit 220. Preferably, the acoustic output unit 220 and the circuit board 210 may be disposed on the same line to allow contact between the connector 230 and a lateral surface of the circuit board 210. Here, "the same line" does not imply that the lines are mathematically pure lines, but are identical lines having errors in view of engineering tolerances.

The front case 100a may include a window 100d with a transparent material to protect the display unit 151 in a region vertically overlapping the display unit 151.

The connector 230 can be connected to the acoustic output unit 220 in various manners. For example, the connector 230 may include a fixed end portion 231 and a free end portion 232.

One end of the fixed end portion 231 is fitted into and connected with the acoustic output unit 220. Details of this connection are described above.

The free end portion 232 is connected to the fixed end portion 231, and adapted to be elastically displaced when contacting the circuit board 210. The direction of displacement of the free end portion 232 is not limited. However, the free end portion 232 is preferably displaced toward the acoustic output unit 220 with regard to space utilization. That is, when one lateral surface of the circuit board 210 approaches a lateral surface of the acoustic output unit 220, the free end portion 232 may be elastically deformed toward the acoustic output unit 220.

The fixed end portion 231 and the free end portion 232 may be formed in the shape of a plate to improve reliability of contact with the circuit board 210 and prevent damage to the circuit board 210.

In addition, to prevent damage to the circuit board 210 during contact between the circuit board 210 and the free end portion 232 and expand the contact area (grounding area) to enhance reliability, the end of the free end portion 232 is bent toward the acoustic output unit 220. The bent portion 233 of the free end portion 232 may contact with a lower region S1 or upper region of the circuit board 210.

An insulation part 210a formed of an insulative material and an electrode 210b formed of a conductive material for supply of electric power may be disposed on the circuit board 210 in various manners to allow various electrical connections of electronic components. For example, as shown in FIG. 7, two electrodes 210b may be vertically disposed, and the insulation part 210a may be disposed between the two electrodes 210b. The electrode 210b may be connected such that opposite polarities are applied to the first connector 230a and the second connector 230b. Here, the lower region S1 of the circuit board 210 indicates the lower portion of a lateral surface of the circuit board 210 through which the electrode 210b is exposed to the outside.

Referring to FIG. 5, a protruding bumper 212 protruding toward the acoustic output unit 220 may be formed at one lateral surface of the circuit board 210. The protruding bumper 212 may protrude from the circuit board 210 toward the acoustic output unit 220 to prevent damage to the acoustic output unit 220 or the circuit board 210 due to collision between the acoustic output unit 220 and the circuit board 210. The protruding length of the protruding bumper 212 is not limited, but may be preferably between 0.1 mm and 0.5 mm.

The protruding bumper 212 may be disposed adjacent to a position on a lateral surface of the circuit board 210 which the free end portion 232 contacts. This is intended to prevent collision between a region of the acoustic output unit 220 not having the free end portion 232 and the circuit board 210. At this time, the lateral surface of the protruding bumper 212 contacts the lateral surface of the free end portion 232, preventing the free end portion 232 from laterally moving during contact with the circuit board 210.

When the surface of the protruding bumper 212 facing the acoustic output unit 220 is defined as the front surface, as shown in FIG. 4, the lateral surface of the protruding bumper 212 refers to the surface of the left and right sides of the protruding bumper 212. When the surface of the free end portion 232 oriented in the direction extending from the acoustic output unit 220 toward the circuit board 210 is defined as the front surface thereof, as in FIG. 4, the lateral surface of the free end portion 232 refers to the surface of the left and right sides of the free end portion 232.

The protruding bumper 212 may be formed of various materials. For example, the protruding bumper 212 may be formed of the same material as that of the circuit board 210. Preferably, to maximize the buffering effect, the protruding bumper 212 may be formed of a material more ductile than that of the circuit board 210.

Referring to FIG. 6, the acoustic output unit 220 may include, for example, a frame 221, a front screen 227A, a rear screen 227B, a yoke 222, a magnet 223, a top plate 224, a diaphragm 225, a voice coil, and a protector 226.

The frame 221 forms a framework of the acoustic output unit 220. The frame 221 is a rectangular structure having an opening in which the magnet 223 is seated.

In addition, the connector 230, which functions to allow electric current to flow to the circuit board 210, is fixed to the frame 221. The magnet 223 is seated in the opening of the frame 221. The magnet 223 is a permanent magnet generating a magnetic field. Two yokes are disposed at the upper and lower sides of the magnet 223. That is, a yoke 222 is disposed at the lower side of the magnet 223 and a top plate 224 is disposed at the upper side of the magnet 223.

A protrusion is formed at the center of the yoke 222. The magnet 223 and the top plate 224 may respectively have an opening vertically overlapping the central portion of the yoke 222.

The voice coil (not shown) and the diaphragm 225 are disposed on the top plate. The voice coil is electrically connected to the connector 230. When electric current is applied to the voice coil, the voice coil is vibrated by a magnetic field.

The diaphragm 225 is attached to the voice coil to vibrate together with the voice coil to produce sound when the voice coil vibrates. The diaphragm 225 is formed of conventional materials such as paper, pulp, talc, mica, polypropylene, graphite, fiber glass, carbon and aluminum.

The protector 226 is disposed on the diaphragm 225. The protector 226 allows the diaphragm 225 to vibrate and protects the diaphragm 225. That is, the protector 226 has a space formed therein within which the diaphragm 225 is positioned and is provided with a plurality of openings to transfer sound.

The front screen 227A and the rear screen 227B form the external appearance of the acoustic output unit 220, prevent introduction of foreign matter into the acoustic output unit 220, and adjust the amount of air introduced into the acoustic output unit 220.

FIG. 7 shows the circuit board 210 and the connector 230, which have not contacted each other yet, and FIG. 8 shows the circuit board 210 in contact with the connector 230. As the circuit board 210 approaches the acoustic output unit 220, the circuit board 210 elastically deforms the free end portion 232, causing the free end portion 232 and the lateral surface of the circuit board 210 to contact each other.

In conventional cases, the circuit board 210 is electrically connected to the acoustic output unit 220 by providing a spring at the upper or lower end of the acoustic output unit 220, or by bonding a wire connected to the acoustic output unit 220 to the circuit board 210 using solder. Using the spring for electrical connection results in increase in thickness of the mobile terminal. In the wire bonding technique, soldering is time consuming, thereby lowering work efficiency. Further, when external shock is applied to the bonded wire, poor contact can occur.

In the illustrated embodiment, the acoustic output unit 220 and the lateral surface of the circuit board 210 contact each other, and therefore do not cause an increase in the thickness of the mobile terminal 100. In addition, since the soldering process is omitted, assembly time can be reduced, and assembly efficiency can be improved. Further, since elastic force instead of soldering is used to form the electrical contact, contact stability is increased. Moreover, since solder is not used, the technique in the illustrated embodiment is environmentally friendly.

Furthermore, as the protruding bumper 212 is formed at the circuit board 210, possible damage to the circuit board 210 or the acoustic output unit 220 due to lateral contact can be prevented.

In addition, as a bracket to protect the acoustic output unit is used. Performance of protection of the acoustic output unit from external shock is improved.

In addition, since the acoustic output unit is protected and a space for reverberation of sound produced by the acoustic output unit is provided, the size of the acoustic output unit can be reduced and a magnificent sound can be produced.

Figure 9:
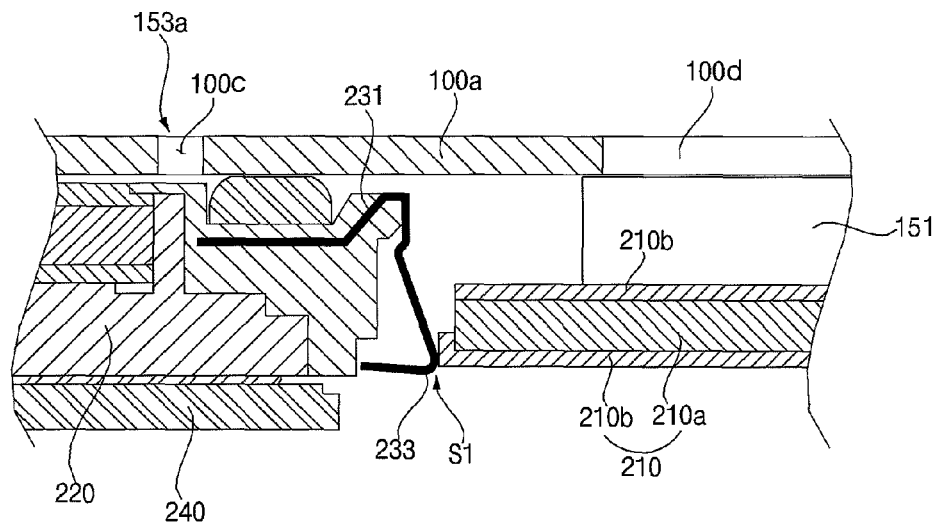
FIG. 9 is a cross-sectional view of another embodiment of the mobile terminal.

FIG. 9 is a cross-sectional view of another embodiment of the mobile terminal.

Referring to FIG. 9, the mobile terminal 100 according to the illustrated embodiment is different from that of the previous embodiment of FIG. 7 in the position at which the electrode 210b is formed. Hereinafter, constituents different from those of the previous embodiment of FIG. 7 will be focused upon, and a description of the constituents described above will be omitted.

The electrode 210b may be formed to extend to the lateral surface of the circuit board 210 that the free end portion 232 contacts. In other words, in the case that the free end portion 232 is arranged to contact the lateral surface of the circuit board 210 through elastic deformation, the electrode 210b formed on and/or under the insulation part 210a can extend to at least one region of the lateral surface of the circuit board 210 to enhance reliability of contact between the electrode 210b and the free end portion 232.

For example, as shown in FIG. 9, the electrode 210b may be formed to extend to the lateral surface of the lower region S1 of the circuit board 210, which contacts the free end portion 232.

Figure 10:
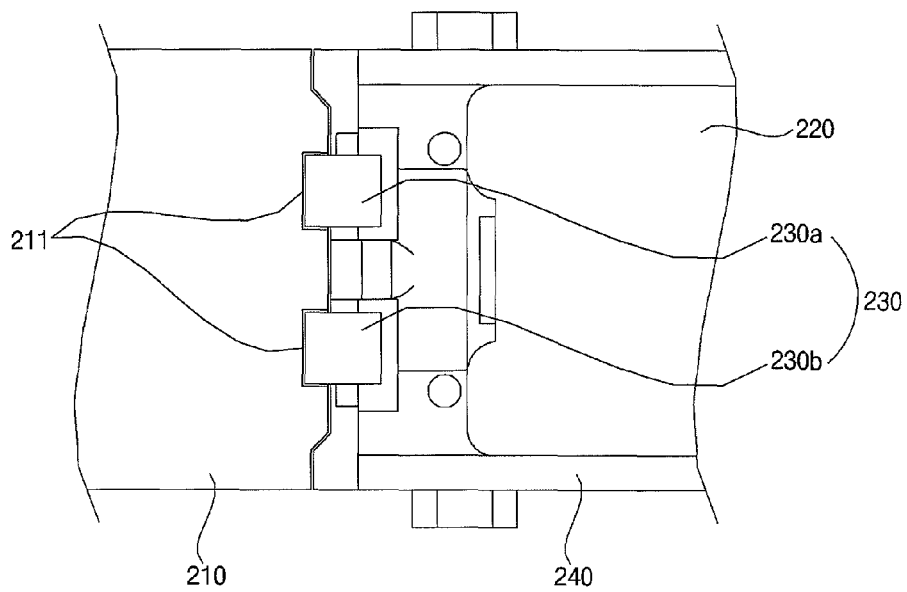
FIG. 10 is a plan view illustrating an example according to another embodiment.

FIG. 10 is a plan view illustrating an example according to another embodiment.

Referring to FIG. 10, the mobile terminal 100 of the illustrated embodiment is different from the previous embodiment of FIG. 4 in that the mobile terminal 100 has a seating recess 211 formed at the circuit board 210. Hereinafter, constituents different from those of the previous embodiment of FIG. 4 will be focused upon. Repeated description of constituents described above will be omitted.

A seating recess 211 allowing the free end portion 232 to be seated therein is formed in one lateral surface of the circuit board 210. The free end portion 232 can be seated in the seating recess 211. That is, to prevent movement of the free end portion 232 in contact with the circuit board 210, a seating recess 211 having a width corresponding to that of the free end portion 232 can be formed. The one lateral surface of the circuit board 210 is the surface thereof facing the acoustic output unit 220.

Accordingly, longitudinal movement of the circuit board 210 and the acoustic output unit 220 can be prevented by the elastic force of the free end portion 232, while lateral movement thereof can be prevented by the seating recess 211.

The seating recess 211 may be a groove providing a space for seating of the free end portion 232. The seating recess 211 is preferably formed to have a width and a shape corresponding to those of the free end portion 232.

The mobile terminal according to the present invention has one or more of the following effects.

According to one embodiment, an acoustic output unit is arranged to contact, on a lateral surface thereof, a lateral surface of a circuit board, and therefore the thickness of the mobile terminal does not increase.

Since the soldering process can be omitted, assembly time can be reduced, and assembly efficiency can be improved.

In addition, since elastic force instead of soldering is used to form the electrical contact, contact stability is increased.

Elastic force allows the circuit board and the acoustic output unit to contact each other even when an external shock is applied thereto, and a seating recess is formed to prevent movement of a connector. Therefore, contact stability between the circuit board and the acoustic output unit can be increased.

In addition, since a bracket to protect the acoustic output unit is used, protection performance of the acoustic output unit from external shock is improved.

Moreover, since the acoustic output unit is protected and a space for reverberation of sound produced by the acoustic output unit is provided, it is possible to reduce the size of the acoustic output unit and produce a magnificent sound.

The effects of the present invention are not limited to those described above. Other effects not described above will be clearly understood by those skilled in the art in view of the disclosure in the accompanying claims.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A mobile terminal comprising:
   a case defining an external appearance of the mobile terminal;
   a circuit board located in the case;
   an acoustic output unit located in the case; and
   a connector joined to the acoustic output unit and electrically connected to the circuit board, the connector being configured to contact one lateral surface of the circuit board and to be elastically deformed through the contact.

2. The mobile terminal according to claim 1, wherein the connector includes:
   a fixed end portion inserted into the acoustic output unit; and
   a free end portion connected to the fixed end portion, the free end portion being configured to be elastically displaced by contact with the circuit board.

3. The mobile terminal according to claim 2, wherein the connector is joined to a lateral surface of the acoustic output unit.

4. The mobile terminal according to claim 2, wherein the connector is integrated with the acoustic output unit.

5. The mobile terminal according to claim 4, wherein the connector and the acoustic output unit are formed by one of insert molding and double-injection molding.

6. The mobile terminal according to claim 2, wherein the case includes:
   a front case having a hole to allow sound produced by the acoustic output unit to pass therethrough; and
   a rear case defining a space, in conjunction with the front case, the circuit board being located in the space,
   wherein the acoustic output unit is located to vertically overlap the hole of the front case.

7. The mobile terminal according to claim 6, wherein the case and the acoustic output unit are spaced from each other to define a reverberation space.

8. The mobile terminal according to claim 6, further comprising a bracket formed to allow the acoustic output unit to be seated therein to mount the acoustic output unit to the case.

9. The mobile terminal according to claim 8, wherein the bracket is formed of a material different from a material of the case, the material of the bracket being more ductile than the material of the case.

10. The mobile terminal according to claim 8, wherein the bracket includes:
    a bottom portion configured to seat the acoustic output unit thereon, the bottom portion being in surface contact with the rear case; and
    a wall portion protruding from the bottom portion to surround a lateral surface of the acoustic output unit.

11. The mobile terminal according to claim 10, wherein the connector is joined to the wall portion, and
    wherein a part of the wall portion facing in a direction in which the connector is joined to the wall portion is partially open to allow displacement of the connector.

12. The mobile terminal according to claim 2, wherein an end of the free end portion is bent toward the acoustic output unit such that a bent part of the free end portion contacts a lower region of the circuit board, and
    wherein the circuit board includes an electrode to supply electric power to the free end portion, the electrode being provided at a lower surface of the circuit board.

13. The mobile terminal according to claim 12, wherein the electrode extends to said lateral surface of the circuit board to which the free end portion contacts.

14. The mobile terminal according to claim 12, wherein said lateral surface of the circuit board is provided with a protruding bumper protruding toward the acoustic output unit.

15. The mobile terminal according to claim 14, wherein the protruding bumper is formed of the same material as a material of the circuit board.

16. The mobile terminal according to claim 14, wherein the protruding bumper is formed of a material more ductile than a material of the circuit board.

17. The mobile terminal according to claim 14, wherein the protruding bumper is disposed adjacent to a position on said lateral surface of the circuit board to which the free end portion contacts.

18. The mobile terminal according to claim 17, wherein a lateral surface of the protruding bumper contacts a lateral surface of the free end portion.

19. The mobile terminal according to claim 12, wherein said lateral surface of the circuit board includes a seating recess to allow the free end portion to be seated therein, and
   wherein the free end portion is seated in the seating recess.

20. The mobile terminal according to claim 2, wherein the acoustic output unit includes at least one of a microphone, a receiver, and a speaker.

* * * * *